United States Patent [19]

Ohi

[11] Patent Number: 4,671,073
[45] Date of Patent: Jun. 9, 1987

[54] INTAKE AIR CONTROL DEVICE FOR AUTOMOTIVE AIR-CONDITIONING APPARATUS

[75] Inventor: Shinichi Ohi, Saitama, Japan

[73] Assignee: Diesel Kiki Co., Ltd., Tokyo, Japan

[21] Appl. No.: 636,516

[22] Filed: Mar. 5, 1986

[30] Foreign Application Priority Data

Mar. 15, 1985 [JP] Japan .................. 60-036201[U]

[51] Int. Cl.$^4$ ........................................... F25D 29/00
[52] U.S. Cl. ........................................ 62/161; 62/244; 98/2.11
[58] Field of Search ............... 62/244, 239, 243, 161, 62/186, 410, 408, 409; 165/16, 41, 42, 43; 236/49; 98/2, 2.01, 2.11

[56] References Cited

U.S. PATENT DOCUMENTS 4,463,801 8/1984 Yoshimi et al. .................. 62/244 X

FOREIGN PATENT DOCUMENTS 0164806 10/1982 Japan ..................................... 62/239
0209612 12/1983 Japan ..................................... 62/239

Primary Examiner—Harry Tanner
Attorney, Agent, or Firm—Wenderoth, Lind & Ponack

[57] ABSTRACT

An intake air control device in an automotive air-conditioning apparatus includes an intake damper angularly movable selectively into a first position for circulating air in the passenger compartment of an automobile, a second position for introducing only ambient air into the passenger compartment, and a third position for introducing a smaller amount of ambient air into the passenger compartment than the amount of ambient air introduced by the intake damper in the second position. When air-conditioning control is commanded while only ambient air is being introduced, the intake damper is controlled to move to the third position for introducing a smaller amount of ambient air than the amount of ambient air introduced by the intake damper in the second position.

2 Claims, 2 Drawing Figures

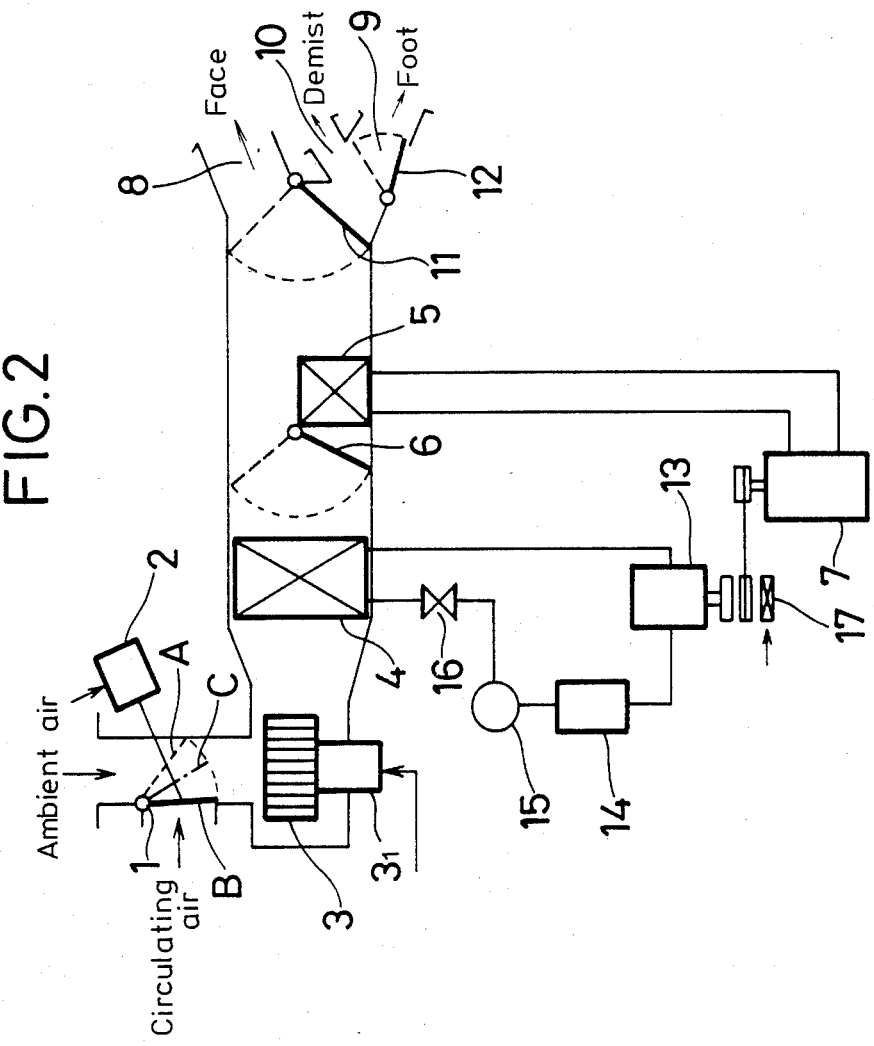

INTAKE AIR CONTROL DEVICE FOR AUTOMOTIVE AIR-CONDITIONING APPARATUS

BACKGROUND OF THE INVENTION

The present invention relates to an intake air control device for an automotive air-conditioning apparatus for air-conditioning the interior cabin of an automobile, and more particularly to such an intake air control device for reducing the amount of air introduced from the exterior of the automobile when air-conditioning control is commanded.

Automotive air-conditioning apparatus have heretofore been employed to air-condition the automobile passenger compartment or cabin. Air is introduced into the automotive air-conditioning apparatus selectively from within the passenger compartment and the exterior of the automobile. The amount of air thus introduced into the automotive air-conditioning apparatus is controlled by an intake damper.

When air-conditioning control is commanded while air is being drawn from the exterior of the automobile, the drawn air is cooled by an evaporator and discharged into the passenger compartment through an outlet. Sometimes, the air introduced from the exterir of the automobile cannot fully be dehumidified, so that a mist may be discharged from the outlet into the passenger compartment. When this happens, the windshield may be frosted by the mist, failing to provide a clear vision needed by the driver for driving the automobile safely.

Such a problem manifests itself particularly when ambient air is highly humid.

No special provision has heretofore been made for solving the foregoing problem.

SUMMARY OF THE INVENTION

It is an object of the present invention to provide an intake air control device in an automotive air-conditioning apparatus which is arranged to reduce the amount of ambient air introduced when a command is given to air-condition the passenger compartment while only ambient air is being introduced from the exterior of the automobile, so that no mist will be discharged via an outlet into the passenger compartment.

According to the present invention, the above object can be achieved by an automotive air-conditioning apparatus includes a changeover means switchable in synchronism with an air-conditioning control command given by an air-conditioning control command switch (hereinafter referred to as an "A/C switch") means, the arrangement being such that when ambient air is to be introduced at the time the air-conditioning command switch is given, an intake damper is controlled by the changeover means to be shifted into an intermediate opening position so as to introduce a smaller amount of ambient air than the amount of ambient air that would be introduced if the changeover means were positioned to introduce ambient air only. When air-conditioning control is selected by the A/C switch means while ambient air is being introduced, therefore, the amount of introduced ambient air is reduced in synchronism with the operation of the A/C switch means.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a shchematic view showing a structural arrangement of the automotive air-conditioning apparatus of the present invention.

DETAILED DESCRIPTION OF THE PREFERRED EMBODIMENT

Figure 1:
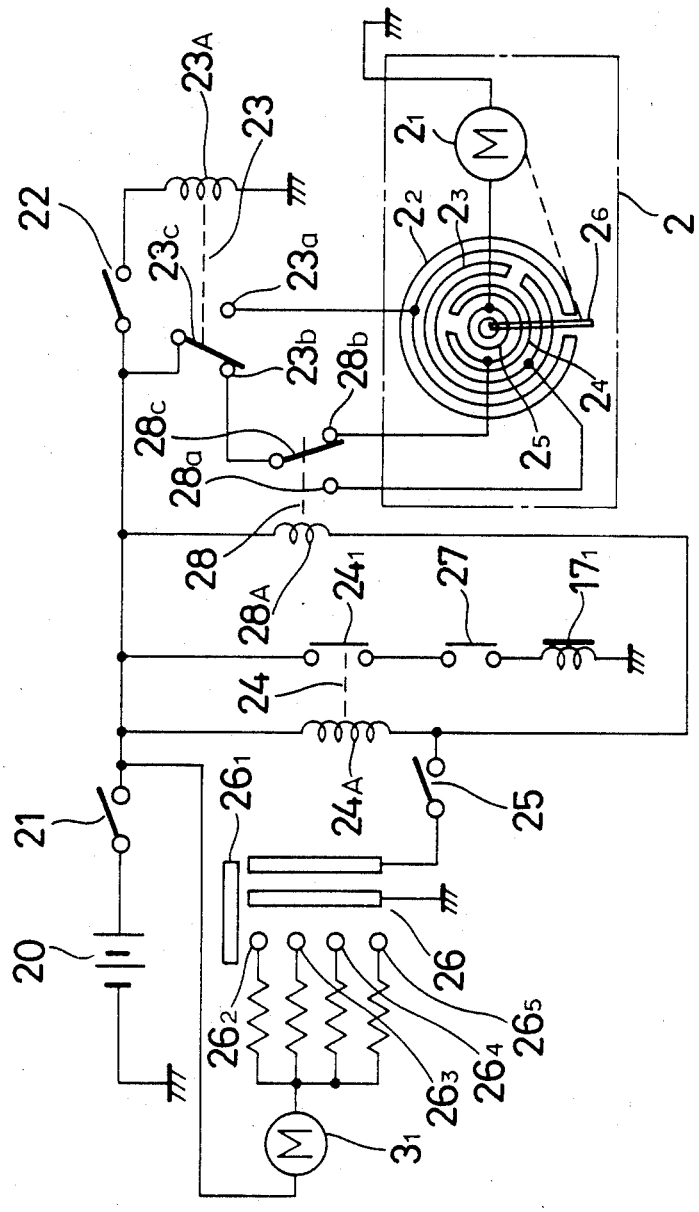
FIG. 1 is a circuit diagram of an automotive air-conditioning apparatus according to the present invention.

As shown in FIG. 2, an automotive air-conditioning apparatus according to the present invention has an intake damper 1 positioned in an intake duct and switchable by a motor actuator 2 between a position A to introduce air from within the automobile passenger compartment of an automobile in which the automotive air-conditioning apparatus is incorporated and a position B to introduce ambient air from the exterior of the automobile. The automotive air-conditioning apparatus also includes an air blower 3, an evaporator 4 for cooling and dehumidifying air drawn by the air blower 3 through the intake damper 1, a heater core 5 for heating air passing therethrough with cooling water from an engine 7 through a heat-exchange process, and a mixing damper 6 for controlling the amount of air from the evaporator 4, which is to be passed through the heater core 5. Air is discharged into the passenger compartment through air outlets 8, 9, 10. The mixing damper 6 is driven by a motor actuator (not shown) to control the ratio of air to be passed through the heater core 5. The air outlets 8, 9, 10 can be closed and opened by mode switching doors 11, 12 that are driven by motor actuator (not shown). Air is discharged into the passenger compartment in a mode selected by the mode switching doors 11, 12. The air outlet 8 is a FACE outlet for discharging air toward the face of a passenger. The air outlet 9 is a FOOT outlet for discharging air toward the passenger's feet. The air outlet 10 is a DEMIST outlet for removing a windowshield mist or frost arising from much humidity in the passenger compartment.

The evaporator 4 is combined with a compressor 13, a condenser 14, a liquid receiver 15, and an expansion valve 16 in constituting a cooling system. The compressor 13 is selectively driven by the engine 7 through a magnetic clutch 17.

As illustrated in FIG. 1, the voltage of a battery 20 mounted on the automobile is applied to a relay coil 23A of a relay 23 via a starting switch 21 and an air circulation switch 22 for commanding air circulation in the passenger compartment. The voltage of the battery 20 through the starting switch 21 is also applied to an A/C relay coil 24A of an A/C relay 24 and also a blower motor $3_1$ through an A/C switch 25 and a blower switch 26. The blower switch 26 has a movable contact $26_1$ and fixed contacts $26_2$, $26_3$, $26_4$, $26_5$. The movable contact $26_1$ is movable into selective contact with the fixed contacts $26_2$, $26_3$, $26_4$, $26_5$ for changing the voltage applied to the blower motor $3_1$.

The voltage of the battery 20 through the starting switch 21 is also impressed on an excitation coil $17_1$ of the magnetic clutch 17 through a contact $24_1$ of the A/C relay 24 and a thermoswitch 27. The thermoswitch 27 serves to compare the output signal from a thermistor which detects the temperature of air at the outlet of the evaporator 4 with a preset value for generating an on-off output signal. The voltage of the battery 20 through the starting switch 21 is also applied through a relay coil 28A of a relay 28 to the A/C switch 25.

The relay 23 has a movable contact 23c to which the voltage of the battery 20 through the starting switch 21 is applied. The relay 23 also has a normally closed contact 23b connected to a movable contact 28c of the relay 28.

The motor actuator 2 comprises a motor $2_1$ coupled as by a link to the intake damper 1 and a group of conductors for positional control of the motor $2_1$. The conductors include annular concentric conductors $2_2$ through $2_5$ and a slider $2_6$ rotatable by the rotor of the motor $2_1$ in sliding contact with the surfaces of the annular conductors $2_2$–$2_5$. The annular conductor $2_2$ is cut off at an angular position corresponding to the position of the intake damper 1 which is indicated by the dotted line A in FIG. 2. The voltage of the battery 20 is applied to the annular conductor $2_2$ through a normally open contact 23a of the relay 23. The annular conductor $2_3$ is cut off at an angular position corresponding to the position of the intake damper 1 which is indicated by the dot-and-dash line C in FIG. 2. The voltage of the battery 20 is applied to the annular conductor $2_3$ through a normally open contact 28a of the relay 28. The annular conductor $2_4$ is cut off at an angular position corresponding to the position of the intake damper 1 which is indicated by the solid line B in FIG. 2. The voltage of the battery 20 is applied to the annular conductor $2_3$ through a normally closed contact 28b of the relay 28. The annular conductor $2_5$ is connected to the motor $2_1$ for applying a driving voltage to the motor $2_1$. When the battery voltage is applied to the conductor $2_2$ while the intake damper 1 is not in the position A, the voltage is applied via the conductor $2_2$, the slider $2_6$, the conductor $2_5$ to the motor $2_1$ to move the intake damper 1 to the position A. When the battery voltage is applied to the conductor $2_3$ while the intake damper 1 is not in the position C, the voltage is applied via the conductor $2_3$, the slider $2_6$, the conductor $2_5$ to the motor $2_1$ to move the intake damper 1 to the position C. When the battery voltage is applied to the conductor $2_4$ while the intake damper 1 is not in the position B, the voltage is applied via the conductor $2_4$, the slider $2_6$, the conductor $2_5$ to the motor $2_1$ to move the intake damper 1 to the position B.

When the starting switch 21 is closed, the voltage of the battery 20 is supplied. If the air circulation switch 22 has been closed at this time, then the relay coil 23A is energized to allow the battery voltage to be applied via the movable contact 23c and the normally open contact 23a to the motor actuator 2. The intake damper 1 is driven by the motor actuator 2 to move toward the positoin A (FIG. 2), whereupon the introduction of ambient air is shut off and air circulates in the passenger compartment.

When the air circulation switch 22 is opened, the relay coil 23A is de-energized to bring the movable contact 23c into contact with the normally closed contact 23b. If the A/C switch 25 is open at this time, then the relay coil 28A is not energized thereby to keep the movable contact 28c and the normally closed contact 28b in mutual contact. Therefore, the battery voltage is applied to the motor actuator 2 through the normally closed contact 28b to enable the motor actuator 2 to drive the intake damper 1 to the position B (FIG. 2). The circulation of air in the passenger compartment is now stopped, and only ambient air is introduced into the passenger compartment.

When the A/C switch 25 is closed, the relay coil 24A is energized. The battery voltage is applied through the blower switch 26 to the blower motor $3_1$ to energized the same. At the same time, the relay contact $24_1$ is closed, and the excitation coil $17_1$ of the magnetic clutch 17 is energized or de-enerigzed dependent on the output signal from the thermoswitch 27. If the thermoswitch 27 is closed, the compressor 13 is operated to cool and dehumidify air passing through the evaporator 4. If the thermoswitch 27 is open, the compressor 13 is stopped.

With the A/C switch 25 closed, the relay coil 28A is also energized to bring the movable contact 28c into contact with the normally open contact 28a. If the air circulation switch 22 has been open at this time, then the movable contact 23c and normally open contact 23b of the relay remain in contact, so that the battery voltage is applied through the normally open contact 28a to the motor actuator 2. The intake damper 1 is then driven by the motor actuator 2 to the intermediate position C (FIG. 2) which may be effective to introduce an amount of ambient air that is $\frac{1}{3}$, for example, of the full amount of ambient air introduced when the intake damper 1 is in the position B. Therefore, when the introduction of ambient air is commanded and the A/C switch 25 is closed, ambient air is controlled to be introduced at a given ratio.

The voltage applied to the blower motor $3_1$ is dependent on the position of the movable contact or slider $26_1$ of the blower switch 26, and hence the amount of air supplied by the air blower is controlled by the position of the slider $26_1$. When the introduction of ambient air is commanded and the A/C switch 25 is closed, as described above, the intake damper 1 is in the prescribed intermediate position to supply ambient air and circulating air at a prescribed ratio.

With the arrangement of the present invention, as described above, the ratio of introduced ambient air is reduced when the introduction of ambient air is commanded and the A/C switch is closed. As a consequence, a mist is substantially prevented from being discharged into the passenger compartment to avoid frosting of the windshield under such a condition. The passenger compartment can be air-conditioned more effectively since the amount of introduced ambient air is reduced. Since substantially no mist is generated and discharged into the passenger compartment, the driver or a passenger in the passenger compartment does not make a mistake of perceiving such a mist as a fire.

Although a certain preferred embodiment has been shown and described, it should be understood that many changes and modifications may be made therein without departing from the scope of the appended claims.

What is claimed is:

1. An intake air control device in an automotive air-conditioning apparatus for use in an automobile having a passenger compartment, comprising:
   an intake damper disposed in an intake duct and angularly movable selectively into a first position for circulating air in the passenger compartment, a second position for introducing only ambient air into the passenger compartment, and a third position for introducing a smaller amount of ambient air into the passenger compartment than the amount of ambient air introduced by the intake damper in said second position;

an air blower for delivering air introduced by said intake damper into the passenger compartment;

cooling means disposed downstream of said air blower for cooling the air delivered by said air blower;

an air outlet for discharging the air from said cooling means into the passenger compartment;

a motor actuator responsive to an external signal for actuating said intake damper into one of said first, second, and third positions;

air circulation command switch means for commanding circulation of air in the passenger compartment;

air-conditioning control command switch means for commanding air-conditioning control to drive said air blower and actuate said cooling means; and changeover control means responsive to an air circulation command from said air circulation command switch means for controlling said motor actuator to actuate said intake damper into said first position, responsive to the absence of an air circulation command from said air circulation command switch means and to the absence of an air-conditioning control command from said air-conditioning control command switch mean for controlling said motor actuator to actuate said intake damper into said second position, and responsive to the absence of an air circulation command from said air circulation command switch means and to an air-conditioning control command from said air-conditioning control command switch means for controlling said motor actuator to actuate said intake damper into said third position.

2. An intake air control device according to claim 1, wherein said changeover control means comprises first changeover switch means switchable in response to an output from said air circulation command switch means and a second changeover switch switchable in response to the supply of an output from a normally closed contact of said first changeover switch to a common contact thereof and also to an output from said air-conditioning control command switch means, the arrangement being such that said intake damper can be actuated by said motor actuator into said first position by an output from a normally open contact of said first changeover switch, into said second position by an output from a normally closed contact of said second changeover switch, and into said third position by an output from a normally open contact of said second changeover switch.

* * * * *

UNITED STATES PATENT AND TRADEMARK OFFICE
CERTIFICATE OF CORRECTION

PATENT NO.   :   4,671,073
DATED        :   June 9, 1987
INVENTOR(S) :   Shinichi OHI It is certified that error appears in the above-identified patent and that said Letters Patent is hereby corrected as shown below:

Item [21]     change "Appln. No.:  636,516" to

--Appln. No.:  836,516--.

Signed and Sealed this

Tenth Day of November, 1987

Attest:

DONALD J. QUIGG

*Attesting Officer*     *Commissioner of Patents and Trademarks*